Patented Aug. 5, 1952

2,606,162

UNITED STATES PATENT OFFICE 2,606,162

COMPOSITIONS COMPRISING POLYISO-
CYANATE MODIFIED POLYESTERS
AND VINYL CHLORIDE POLYMERS

David Hay Coffey, Owen Burchell Edgar, Thomas James Meyrick, and John Thomas Watts, Manchester, England, assignors to Imperial Chemical Industries Limited, a corporation of Great Britain No Drawing. Application January 24, 1949, Serial No. 72,552. In Great Britain January 30, 1948

2 Claims. (Cl. 260—22)

This invention relates to compositions comprising polymeric materials, more particularly to compositions comprising organic polyisocyanate modified polyesters in admixture with polyvinyl chloride, and to articles and other compositions made therefrom.

According to the present invention we provide compositions comprising organic polyisocyanate modified polyester in uniform admixture with polyvinyl chloride.

We have found that in such compositions the polyisocyanate modified polyester has the properties of an excellent plasticizer and is of particular advantage because it does not readily volatilise or migrate from the compositions. The polyisocyanate modified polyesters show considerable advantage over the unmodified polyesters in that they are much more readily mixed into the polyvinyl chloride, and in that any tendency to separate from or bleed out of the compositions is either very much less or completely absent.

Compositions wherein the organic polyisocyanate modified polyester has an excellent plasticising effect on the polyvinyl chloride are those wherein from 20 to 100 parts by weight of modified polyester are used per 100 parts of polyvinyl chloride.

The polyvinyl chloride may be used in the form of an interpolymer of vinyl chloride with one or more other compounds of polymerisable olefinic nature which is or are not used in preponderating amount, for example, other vinyl esters such as vinyl acetate, unsymmetrical dichloroethylene, styrene, and the esters, nitriles and amides of acrylic, methacrylic, fumaric and maleic acids.

The polyester may be formed conveniently by heating the selected reactants at polymerizing temperatures in the absence of air or oxygen under conditions whereby water is removed from the reaction mixture in any conventional manner. Usually, the polyester is formed from a glycol and a dibasic carboxylic acid or an ester-forming derivative of either or both of these or a mixture of two ore more of such components. If desired, a proportion of a monobasic carboxylic acid or an ester-forming derivative thereof may be included among the reactants.

Examples of glycols are ethylene glycol, propylene glycol, diethylene glycol, trimethylene glycol, pentamethylene glycol, hexamethylene glycol, decamethylene glycol, dodecamethylene glycol, 1:12-octadecanediol and pentaglycol.

Examples of dibasic carboxylic acids are malonic, succinic, glutaric, adipic, β-methyl-adipic, pimelic, suberic, azelaic, sebacic, undecanedioic, brassylic, isophthalic, hexahydroterephthalic, p-phenylene-diacetic and acetone-dicarboxylic acid.

Especially suitable monobasic carboxylic acids are those containing from 10 to 18 carbon atoms, for example, lauric, myristic, palmitic and stearic acids, as well as hydroxy-derivatives of these, for example, hydroxy-stearic acid. Usually, the polyesters used have a molecular weight of 1000 or more. Molecular weight is usually determined by analysing the end groups of the polyesters, and by calculation from the results thereof.

The polyesters are modified with the organic polyisocyanate in known manner, for example, by mixing them by stirring, milling or kneading, with the organic polyisocyanate and then heating the mixture, for example, at a temperature of 100–200° C. for a period of 10 to 720 minutes. Up to 15%, usually at least 3% by weight of the polyisocyanate is used. A factor which influences the choice of the quantity of the organic polyisocyanate is the molecular weight of the final product, i. e. the organic polyisocyanate modified polyester. Usually, the molecular weight of the organic polyisocyanate modified polyester is greater than 10,000, and a sufficiency of the polyisocyanate is used to allow the formation of a final product of this molecular weight. An indication of the molecular weight may be obtained by measurement of intrinsic viscosity, and those modified polyesters having intrinsic viscosities in chloroform of 0.6 or more may be taken as conforming to the molecular weight requirement mentioned above. Further, useful compositions have been obtained from organic polyisocyanate modified polyesters which are not soluble in solvents such as chloroform, and viscosity measurements have not been made on these. Since these modified polyesters have been made with the use of relatively large proportions of the polyisocyanates, their molecular weights may be taken as well above the requirement mentioned. When the polyester contains a proportion of a monocarboxylic acid, the molecular weight may be below the requirement mentioned.

Examples of organic polyisocyanates are hydrocarbon polyisocyanates including ethylene diisocyanate, trimethylene diisocyanate, tetramethylene diisocyanate, hexamethylene diisocyanate, decamethylene diisocyanate, p-phenylenediisocyanate, m-phenylene diisocyanate, naphthalene diisocyanates, benzene 1:3:5-triisocyanate, toluene-2:4:6-triisocyanate, ethylbenzene - 2:4:6 - triisocyanate, monochlorobenzene-2:4:6-triisocyanate, triphenylmethane-4:4′:4″-triisocyanate and diphenyl-2:4:4′-triisocyanate. These polyisocyanates may be obtained by passing phosgene into a suspension of the corresponding amine hydrochloride in an inert medium, for example, ortho-dichlorobenzene, at a temperature of 140–180° C.

The organic polyisocyanate modified polyester or a mixture of more than one such modified polyester may be brought into uniform admixture with the polyvinyl chloride in a number of ways. For instance, the components may be mixed or milled together, if desired, at a moderately elevated temperature, as such or in the presence of organic liquids, for example, nitroparaffins, chloroform, ethylene dichloride, benzene and mixtures of ethyl acetate with ethylene dichloride which are solvents or swelling agents for one or both of the components; the organic liquids may be removed as and when convenient. Alternatively, solutions of the components may be mixed.

If desired, the organic polyisocyanate modified polyester may be formed in situ, as by incorporating the polyester or mixture of polyesters with the polyvinyl chloride and by also incorporating with such mixture an organic polyisocyanate or mixture of organic polyisocyanates, and thereafter subjecting the composition to a heating operation whereby the modified polyester or mixture thereof is formed.

Other ingredients can be incorporated in the compositions. These include curing agents and curing catalysts of the kinds described in British Specifications Nos. 580,524 and 580,526, additional organic polyisocyanates, fillers, such as carbon black, iron oxides, clay, asbestos, blanc fixe, whiting, lithopone, other inorganic or organic pigments other plasticizers such as tricresyl phosphate, dibutyl phthalate, butylphthalyl butyl glycollate, N-alkyl-toluenesulphonamides, stabilisers or anti-oxidants such as hydroquinone, N:N′-hexamethylene-bis-ortho-hydroxybenzamide, N-phenyl-$\alpha$-naphthylamine, N-phenyl-$\beta$-naphthylamine and $\alpha$:$\alpha$-bis-(2-hydroxy-3:5-dimethyl phenyl)-butane.

The compositions of the invention may be formed into films or other shapes or spread or calendered on to a substrate, for example, on to the surface of a fabric or on to the surface of a coated fabric. If curing agents are used, curing may be effected by heating, for example, in a mould which is preferably in a hydraulic press, or in hot air; periods of heating of from a few minutes to several hours at 100–150° C. are usual. If desired, to facilitate shaping or spreading, organic solvents and/or swelling agents may be used.

The compositions of the invention may be used in the fabrication of a variety of articles in which they may or may not be supported on a substrate and/or interspersed with a filler. For instance, they may be used for organic liquid-resistant articles of all kinds, for example, gaskets, packings, hose diaphragms for pumps, as well as in the fabrication of flexible containers for fuels and the like. They may be used to provide the insulation for electrical conductors.

They may also be used in the coating of balls for games, tyres and flexible materials generally, including fabrics, protective clothing, leather cloth and floor coverings. They may also be used in lacquers or varnishes, for finishing leather, paper, rubber, and plastic materials, and as components for paints.

Intrinsic viscosity, as used herein, is defined as $$\frac{\log_e \eta r}{C}$$

where $\eta r$ is the viscosity of a dilute chloroform solution of the polymer divided by the viscosity of chloroform at the temperature of measurement, and $C$ is the concentration expressed in grams per 100 cubic centimetres of solution.

The invention is illustrated but not limited by the following examples in which parts and percentages are expressed by weight.

Example 1

2 parts of polyethylene sebacate modified with 3.85% of hexamethylene diisocyanate are added to 4 parts of polyvinyl chloride which is running on a rubber mill with the rolls maintained at a temperature of 125° C. The modified polyethylene sebacate is added in small amounts, and the mixing is continued until the mass is homogeneous.

The resulting mix is pressed for two minutes at 141° C. between stainless steel plates, and is cooled under pressure. A transparent, flexible sheet is obtained.

The modified polyethylene sebacate used in this example is obtained as follows:

71.3 parts of ethylene glycol and 202 parts of sebacic acid are heated together under carbon dioxide at 210–220° C. for 28 hours. The product is a fawn-coloured, brittle wax melting at 70° C. and having a molecular weight of 3,500.

100 parts of this low molecular weight polyester are heated in a vessel up to 75° C., 3.85 parts of hexamethylene diisocyanate are added and the mixture is stirred for 5 minutes. The mixture is then poured into metal trays, and the trays and contents are heated in an oven at 130° C. for 4 hours. The hexamethylene diisocyanate modified polyethylene sebacate thus obtained is a hard tough material which is soluble in chloroform; it has an intrinsic viscosity of 0.73.

Example 2

8 parts of polyvinyl chloride are run on a roller mill with rolls maintained at a temperature of 125° C. 2 parts of polyethylene sebacate modified with 7.35% of hexamethylene diisocyanate are added slowly to the polymer on the mill. Milling is continued until the mass is homogeneous.

The so obtained mix is sheeted out and pressed between stainless steel plates at a temperature of 141° C. for two minutes. After cooling under pressure, a transparent, flexible sheet is obtained.

Similar results are obtained by using twice the quantity of the modified polyethylene sebacate, but a more flexible film is obtained.

The modified polyethylene sebacate used in this example is obtained as follows:

808 parts of sebacic acid and 620 parts of ethylene glycol are heated together under nitrogen at 200–220° C. for 12 hours, after which time the distillation of water has ceased and the acid value of the material is less than 1 milligram of KOH per gram. Ethylene glycol is then distilled off by heating at 220° C. at a pressure of 15 mm. of mercury for 5 hours. The product is a white, brittle wax, melting at 70° C.; it has a molecular weight of 2,500.

100 parts of this polyester are heated to 85° C., 7.35 parts of hexamethylene diisocyanate are added, and the mixture is stirred for 15 minutes at 85–90° C. The mixture is then transferred to metal trays and heated in an oven at 140° C. for 2 hours.

The hexamethylene diisocyanate modified polyethylene sebacate thus obtained is a hard tough material which is soluble in chloroform; it has an intrinsic viscosity of 1.11.

Example 3

1 part of the interpolymer of vinyl chloride and vinyl acetate in the proportion of 90:10 by weight is run on a roller mill with rolls maintained at a temperature of 100° C. To this polymer is added 0.5 part of the modified polyethylene sebacate described in Example 2. Mixing is continued until the components are thoroughly blended.

The resulting mix is sheeted off the mill and pressed between stainless steel plates for two minutes at 125° C. A colourless, transparent and flexible film is obtained.

Example 4

1 part of an interpolymer of vinyl chloride and vinyl acetate in about the proportion of 95:5 is run on a roller mill with the rolls maintained at a temperature of 125° C. 0.25 part of the modified polyethylene sebacate described in Example 2 is added slowly, and mixing is continued until the components are thoroughly blended.

The so obtained mix is sheeted off the mill, and the rough sheet is pressed between stainless steel plates for two minutes at 141° C. A flexible, transparent film is obtained.

Example 5

Two parts of polyvinyl chloride are run on a roller mill with rolls maintained at 140° C. One part of polypropylene adipate modified with 4.5% of hexamethylene diisocyanate is added, slowly at first, to the polyvinyl chloride on the mill. The rate of addition is increased after half of the modified polyester has been and, when the whole of the modified polyester has been added, milling is continued until the mass is homogeneous.

This mix is sheeted out and pressed out between stainless steel plates at a temperature of 170° C. for 2 minutes. After cooling under pressure, a transparent flexible sheet is obtained.

The modified polypropylene adipatic used in this example is obtained as follows:

584 parts of adipic acid and 608 parts of propylene glycol are heated together under nitrogen at 200° C. for 10 hours, after which time the distillation of water has ceased and the acid value of the material is less than 1 milligram of KOH per gram. Propylene glycol is then distilled off by heating at 200° C. at a pressure of 0.5 cc. of mercury for 6 hours. The product is a yellow viscous liquid; it has a molecular weight of 2,800.

100 parts of this polyester are heated up to 70° C., 4.5 parts of hexamethylene diisocyanate are added, and the mixture is stirred for 10 minutes. The mixture is then transferred to metal trays and heated in an oven at 130° C. for 5 hours.

The hexamethylene diisocyanate modified polypropylene adipate thus obtained is a soft rubbery material; it has a molecular weight greater than 10,000.

Example 6

Two parts of polyvinyl chloride are mixed with 1 part of polypropylene sebacate modified with 3.36% of hexamethylene diisocyanate in the manner described in Example 5.

The so obtained mix is sheeted out and pressed between stainless steel plates at a temperature of 175° C. for 2 minutes. On cooling under pressure a soft, flexible, homogeneous, transparent film is obtained.

The modified polypropylene sebacate used in this example is obtained as follows:

404 parts of sebacic acid and 167 parts of 1:2-propylene glycol are heated together under nitrogen at 200° C. for 24 hours after which time the distillation of water had ceased. Propylene glycol is then distilled off by heating at 200° C. at a pressure of 0.5 mm. of mercury for 6 hours. The product is a dark brown viscous liquid.

100 parts of this polyester are mixed with 3.36 parts of hexamethylene diisocyanate at 80° C. The mixture is then transferred to metal trays and heated at 140–150° C. for 2 hours.

The hexamethylene diisocyanate modified polypropylene sebacate thus obtained is a dark brown rubbery material; it has a molecular weight greater than 10,000.

Example 7

Two parts of polyvinyl chloride are run on a roller mill with the temperature of the rolls kept steady at 140° C. One part of an ethylene adipate/sebacate copolymer modified with hexamethylene diisocyanate is added at such a speed as to allow the mill to continue running with no heat in the band. Milling is continued to achieve homogeneity. The mix is sheeted out and pressed between aluminium foil sheets at 175° C. A flexible, clear, non-brittle film is obtained.

The modified ethylene adipate/sebacate copolymer used in this example is obtained as follows:

487 parts of adipic acid, 673 parts of sebacic acid and 1240 parts of ethylene glycol are heated together under carbon dioxide at 200° C. for 24 hours, after which time the distillation of water has ceased and the acid value of the material is about 1 milligram of KOH per gram. Ethylene glycol is then distilled off by heating at 200° C. at a pressure of 0.1 mm. of mercury for 4 hours. The product is a white wax melting at 48° C.; it has a molecular weight of 3700.

100 parts of this polyester are mixed with 4.8 parts of hexamethylene diisocyanate for 5 minutes at 80° C. The mixture is then transferred to metal trays and heated in an oven at 130° C. for 4 hours.

The hexamethylene diisocyanate modified ethylene adipate/sebacate copolymer thus obtained is a hard tough material which is insoluble in chloroform. It contains adipic acid and sebacic acid in equal molecular proportions, and it has a molecular weight greater than 10,000.

Example 8

The recipe of Example 7 is repeated using an interpolymer of vinyl chloride and vinyl acetate in the ratio of 95:5 in place of the polyvinyl chloride. The film obtained is transparent, soft and flexible.

Example 9

Two parts of polyvinyl chloride are run on a roller mill with the temperature kept constant at 135° C. One part of an ethylene adipate/sebacate copolymer modified with 3.8% hexamethylene diisocyanate is added steadily. After complete addition milling is continued to give homogeneity.

A film obtained by pressing the mix between stainless steel plates at 170° C. is soft, flexible and transparent.

A similar film is obtained by using an interpolymer of vinyl chloride and vinyl acetate in the ratio of 95:5 in place of the polyvinyl chloride.

The modified ethylene adipate/sebacate copolymer used in this example is obtained as follows:

292 parts of adipic acid, 943 parts of sebacic acid and 1240 parts of ethylene glycol are heated together under carbon dioxide at 200° C. for 20 hours, after which time the acid value of the material is below 1 milligram of KOH per gram. Ethylene glycol is then distilled off by heating at 200° C. at a pressure of 1 mm. of mercury for 5 hours. The product is a white crystalline wax melting at 59° C.

100 parts of this polyester are mixed with 3.8% hexamethylene diisocyanate at 80° C. The mixture is then transferred to metal trays and heated at 130° C. for 4 hours.

The hexamethylene diisocyanate modified ethylene adipate/sebacate copolymer thus obtained is a hard, tough, material which is insoluble in chloroform. It contains adipic acid and sebacic acid in the molecular proportions of 30:70, and it has a molecular weight greater than 10,000.

Example 10

Two parts of polyvinyl chloride are run on a roller mill with the rolls maintained at a temperature of 130° C. One part of polyhexamethylene glutarate modified with hexamethylene diisocyanate is added steadily. After addition is completed, milling is further continued to yield a homogeneous product. The material is sheeted out and pressed between aluminum foil with a platten temperature of 175° C. The film so obtained is soft, flexible and transparent, and it has a good tear resistance.

The modified polyhexamethylene glutarate used in this example is obtained as follows:

79.2 parts of glutaric acid and 72.0 parts of hexamethylene glycol are heated together under nitrogen at 200° C. for 2 hours, and then further heated at 200° C. at a pressure of 0.2 mm. of mercury for 4 hours. The product is a white brittle wax, melting at 27° C.; it has a molecular weight of 3200.

100 parts of this polyester are mixed with 5.3 parts of hexamethylene diisocyanate at 70° C. The mixture is then transferred to metal trays and heated in an oven at 130° C. for 4 hours.

The hexamethylene diisocyanate modified polyhexamethylene glutarate thus obtained is a soft rubbery material; it has a molecular weight of greater than 10,000.

Example 11

Two parts of polyvinyl chloride are mixed with 1 part of polyhexamethylene adipate modified with hexamethylene diisocyanate in the manner described in Example 10.

A flexible transparent film is obtained by pressing the mix at 175° C. between stainless steel plates.

The modified polyhexamethylene adipate used in this example is obtained as follows:

330 parts of adipic acid and 270 parts of hexamethylene glycol are heated together under nitrogen at 200° C. for 3 hours, and then further heated at 200° C. at a pressure of 1.0 mm. of mercury for 2 hours. The product is a white, brittle wax, melting at 63° C.; it has a molecular weight of 2,800.

100 parts of this polyester are mixed with 7.67 parts of hexamethylene diisocyanate at 80° C. The mixture is then transferred to metal trays and heated in an oven at 130° C. for 4 hours.

The hexamethylene diisocyanate modified polyhexamethyleneglycol adipate thus obtained is a tough, hard, microcrystalline material melting at 63° C.; it has a molecular weight greater than 10,000.

Example 12

The recipe of Example 11 is repeated using in place of the modified polyhexamethylene adipate a polyhexamethylene succinate modified with hexamethylene diisocyanate. A very similar film is obtained.

The modified polyhexamethylene succinate used in this example is obtained as follows:

442 parts of succinic acid and 244 parts of hexamethylene glycol are heated together under nitrogen at 200° C. for 2 hours, and then further heated at 200° C. at a pressure of 0.5 mm. of mercury for 3 hours. The product is a white, brittle wax, melting at 59° C.; it has a molecular weight of 4,000.

100 parts of this polyester are mixed with 5.3 parts of hexamethylene diisocyanate at 80° C. The mixture is then transferred to metal trays and heated in an oven at 130° C. for 4 hours.

The hexamethylene diisocyanate modified polyhexamethylene succinate thus obtained is a hard tough microcrystalline material; it has a molecular weight greater than 10,000.

Example 13

2 parts of polyvinyl chloride are run on a roller mill with rolls maintained steady at 140° C. One part of a propylene adipate/laurate copolymer modified with hexamethylene diisocyanate is added steadily to the polyvinyl chloride on the mill. The materials are easily compatible, but a further 5 minutes milling is given after completion of additions, in order to ensure homogeneity.

The mix is sheeted out and pressed between stainless steel plates with the press temperature at 175° C. A soft, flexible film which does not show opacity on stretching and which has good tear strength is obtained.

The modified propylene adipate/laurate copolymer used in this example is obtained as follows:

73 parts of adipic acid, 66.6 parts of lauric acid and 55.7 parts of propylene glycol are heated together under carbon dioxide at 200–220° C. for 18 hours. The product is a fairly viscous, brown liquid with an intrinsic viscosity of 0.06.

100 parts of this polyester are mixed with 9 parts of hexamethylene diisocyanate at 70° C. The mixture is then transferred to metal trays and heated in an oven at 130° C. for 4 hours.

The hexamethylene diisocyanate modified propylene adipate/laurate copolymer is a viscous liquid having an intrinsic viscosity in chloroform of 0.13.

Example 14

The recipe of Example 13 is repeated using in place of the modified propylene adipate/laurate copolymer a propylene adipate-stearate copolymer modified with hexamethylene diisocyanate. A similar film is obtained.

The modified propylene adipate/stearate copolymer used in this example is obtained as follows:

73 parts of adipic acid, 95 parts of stearic acid and 55.7 parts of propylene glycol are heated together under carbon dioxide at 200–220° C. for 24 hours. The product is a fairly viscous, brown liquid with an intrinsic viscosity of 0.06.

100 parts of this polyester are mixed with 7 parts of hexamethylene diisocyanate at 70° C. The mixture is then transferred to metal trays and heated in an oven at 130° C. for 4 hours.

The hexamethylene diisocyanate modified propylene adipate/stearate copolymer is a viscous liquid having an intrinsic viscosity of 0.18.

*Example 15*

The recipe of Example 13 is repeated using in place of the modified propylene adipate/laurate copolymer a modified propylene adipate/12-hydroxystearate copolymer.

A good, clear film of good flexibility and tear resistance is obtained.

The modified propylene adipate/12-hydroxystearate copolymer used in this example is obtained as follows:

30 parts of adipic acid, 20 parts of 12-hydroxystearic acid (hydrogenated castor oil fatty acids) and 20.6 parts of propylene glycol are heated together under carbon dioxide at 200° C. for 1 hour, and then further heated at 200° C. at a pressure of 0.5 mm. of mercury for 6½ hours. The product is a viscous brown liquid having an intrinsic viscosity of 0.06.

100 parts of this polyester are mixed with 20 parts of hexamethylene diisocyanate at 70° C. The mixture is then transferred to metal trays and heated in an oven at 130° C. for 4 hours.

The hexamethylene diisocyanate modified propylene adipate 12-hydroxystearate copolymer is a viscous liquid having an intrinsic viscosity in chloroform of 0.27.

We claim:

1. A composition comprising from 20 to 100 parts by weight of a hydrocarbon polyisocyanate-modified polyester of a glycol and a dicarboxylic acid having a molecular weight greater than 10,000 and 100 parts by weight of a vinyl chloride polymer selected from the group consisting of polyvinyl chloride and an interpolymer of a preponderating amount of vinyl chloride with another mono-olefinic compound copolymerizable therewith.

2. A composition comprising from 20 to 100 parts by weight of a hydrocarbon polyisocyanate-modified polyester of a glycol, a monocarboxylic acid, and a dicarboxylic acid having a molecular weight greater than 10,000 and 100 parts by weight of a vinyl chloride polymer selected from the group consisting of polyvinyl chloride and an interpolymer of a preponderating amount of vinyl chloride with another mono-olefinic compound copolymerizable therewith.

DAVID HAY COFFEY.
OWEN BURCHELL EDGAR.
THOMAS JAMES MEYRICK.
JOHN THOMAS WATTS.

REFERENCES CITED

The following references are of record in the file of this patent:

UNITED STATES PATENTS

| Number | Name | Date |
|---|---|---|
| 2,036,009 | Wright | Mar. 31, 1936 |
| 2,282,827 | Rothrock | May 12, 1942 |
| 2,422,271 | Vaala et al. | June 17, 1947 |

FOREIGN PATENTS

| Number | Country | Date |
|---|---|---|
| 586,826 | Great Britain | Apr. 1, 1947 |